US011858129B2

(12) United States Patent
Jung et al.

(10) Patent No.: US 11,858,129 B2
(45) Date of Patent: Jan. 2, 2024

(54) MOBILE ROBOT

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 688 days.

(21) Appl. No.: 16/982,892

(22) PCT Filed: Jan. 2, 2019

(86) PCT No.: PCT/KR2019/000052
§ 371 (c)(1),
(2) Date: Sep. 21, 2020

(87) PCT Pub. No.: WO2020/141628
PCT Pub. Date: Jul. 9, 2020

(65) Prior Publication Data
US 2021/0001477 A1    Jan. 7, 2021

(51) Int. Cl.
B25J 9/00      (2006.01)
B25J 5/00      (2006.01)
B25J 9/12      (2006.01)
B25J 19/00     (2006.01)

(52) U.S. Cl.
CPC ............ *B25J 9/0009* (2013.01); *B25J 5/007* (2013.01); *B25J 9/126* (2013.01); *B25J 19/00* (2013.01)

(58) Field of Classification Search
CPC . B25J 9/0009; B25J 5/007; B25J 9/126; B25J 19/00; B25J 11/008; B25J 11/00; B25J 19/061

USPC ............ 318/568.12, 568.11, 568.1, 567, 560
See application file for complete search history.

(56) References Cited

U.S. PATENT DOCUMENTS

| 7,262,573 B2* | 8/2007 | Wang ..................... A61B 34/30 |
| | | 318/568.25 |
| 9,498,886 B2* | 11/2016 | Rosenstein ............ B25J 13/084 |
| 10,232,508 B2* | 3/2019 | Lafaye ..................... B25J 5/007 |
| 2005/0070136 A1 | 3/2005 | Korsunsky et al. |

(Continued)

FOREIGN PATENT DOCUMENTS

| CN | 207930678 A | 10/2018 |
| CN | 108888245 A | 11/2018 |
| KR | 10-2018-0074486 A | 7/2018 |

(Continued)

OTHER PUBLICATIONS

International Search Report, issued in PCT/KR2019/000052, PCT/ISA/210, dated Oct. 1, 2019.

*Primary Examiner* — David Luo
(74) *Attorney, Agent, or Firm* — Birch, Stewart, Kolasch & Birch, LLP

(57) ABSTRACT

According to an embodiment of the present disclosure, a mobile robot may include a body provided with a driving unit, a body display unit positioned on an upper side of a front portion of the body, extending vertically, and provided with a display on a front surface thereof, a supporter extending vertically inside the body display unit and having a lower end supported by the body, and an interface module supported by the supporter and electrically connected to the display.

18 Claims, 14 Drawing Sheets

(56) References Cited

U.S. PATENT DOCUMENTS

2009/0177323 A1 7/2009 Ziegler et al.
2015/0012163 A1 1/2015 Crawley

FOREIGN PATENT DOCUMENTS

| KR | 10-2018-0077946 A | 7/2018 |
| KR | 10-2018-0080499 A | 7/2018 |

* cited by examiner

【Figure 1】
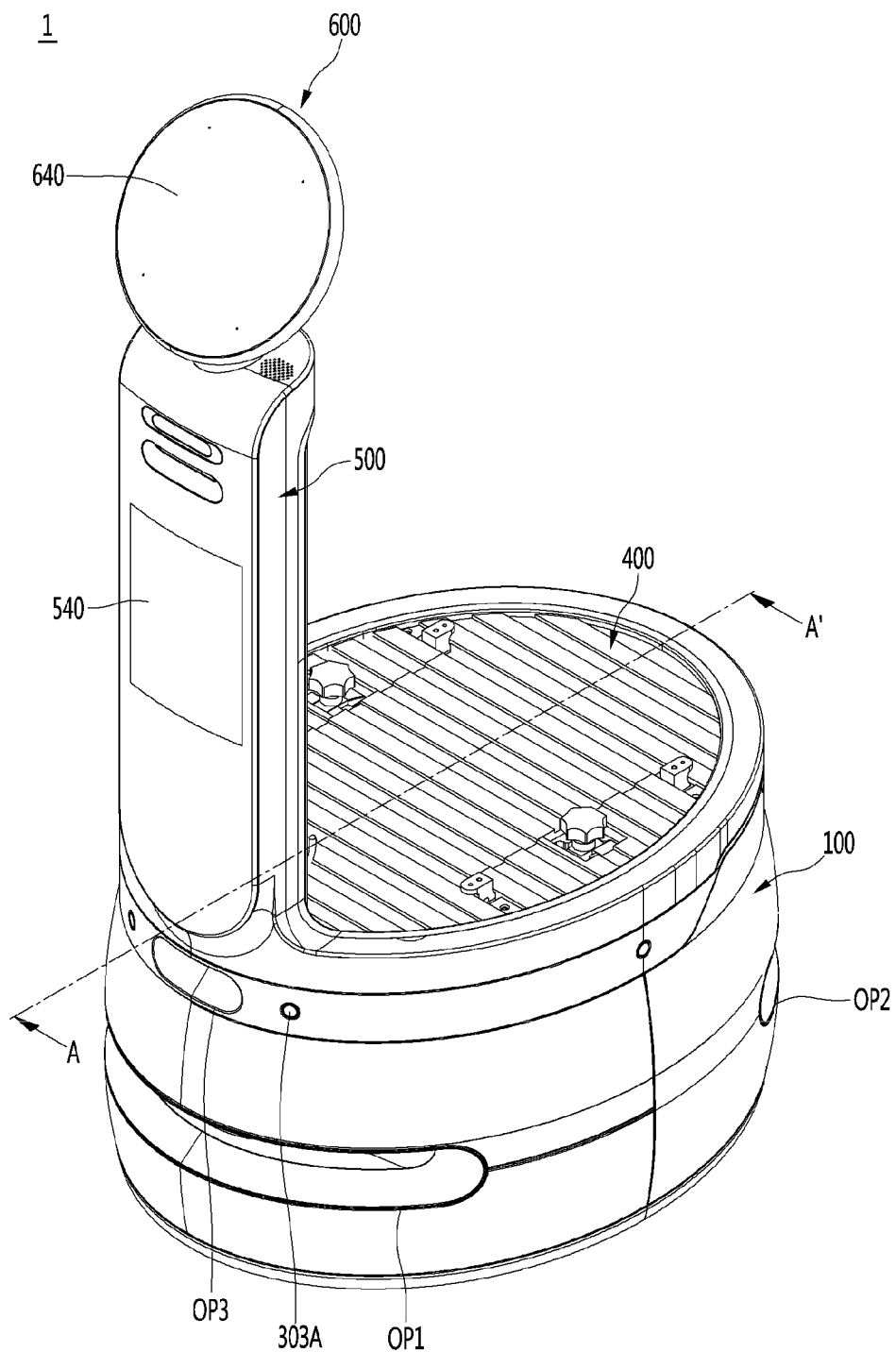

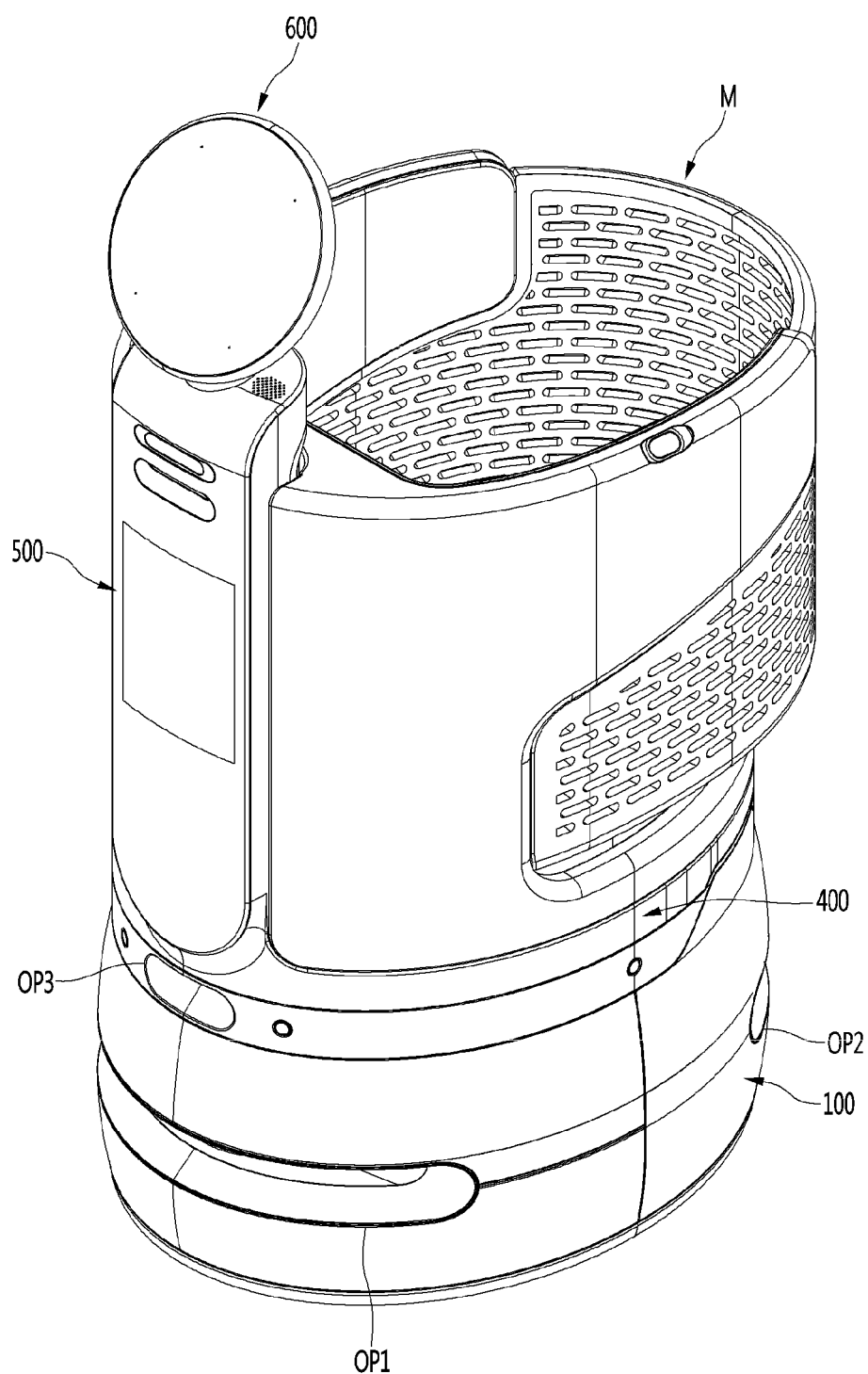
[Figure 2]

[Figure 3]
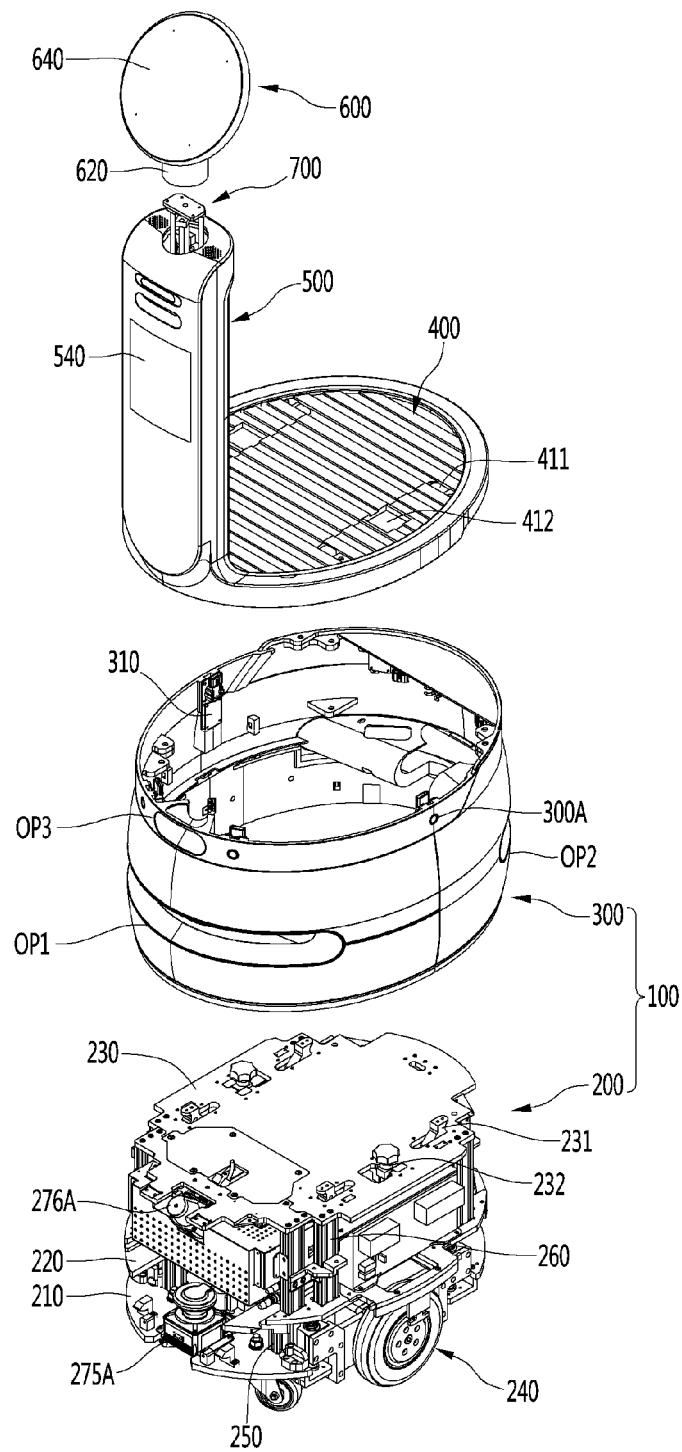

【Figure 4】
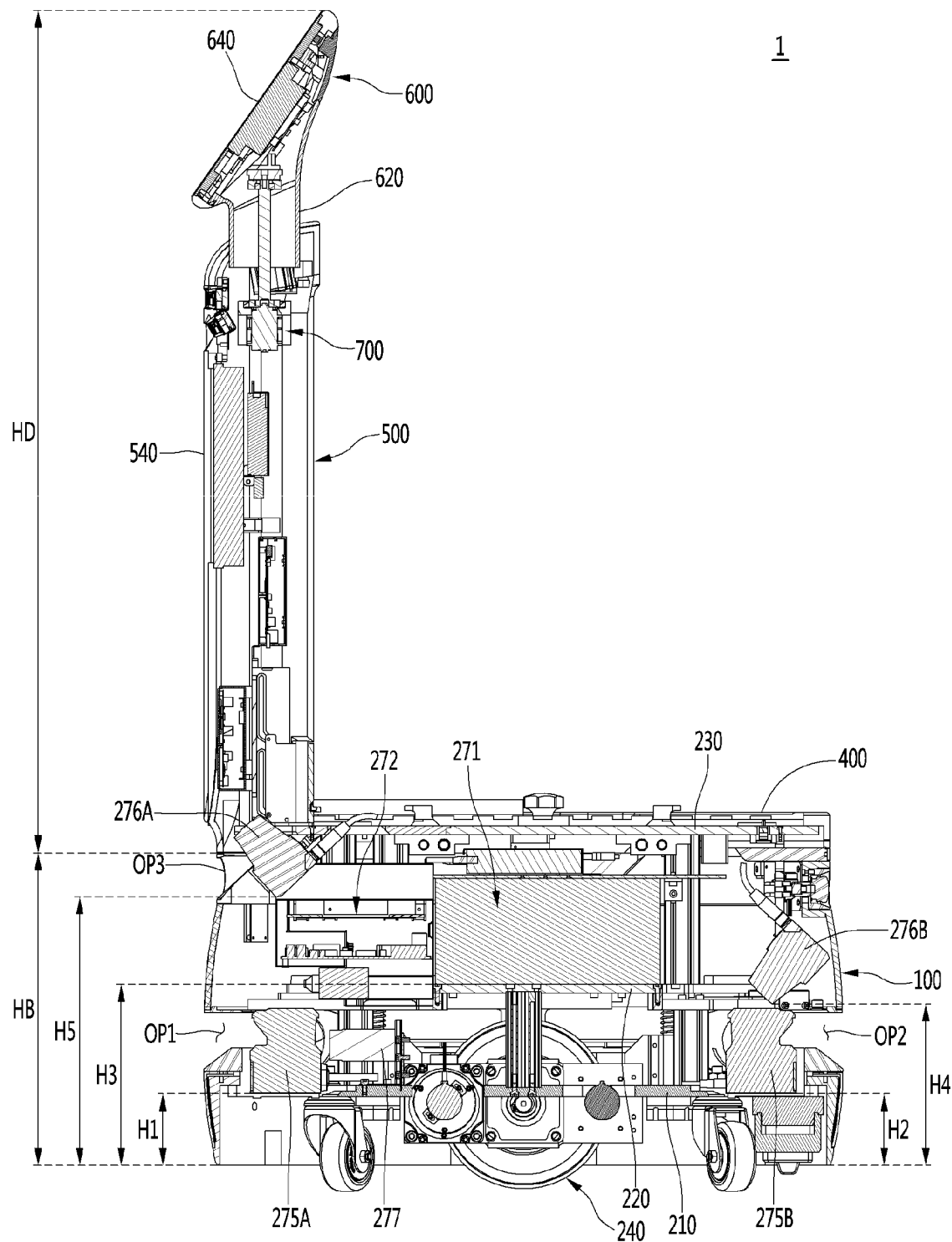

【Figure 5】
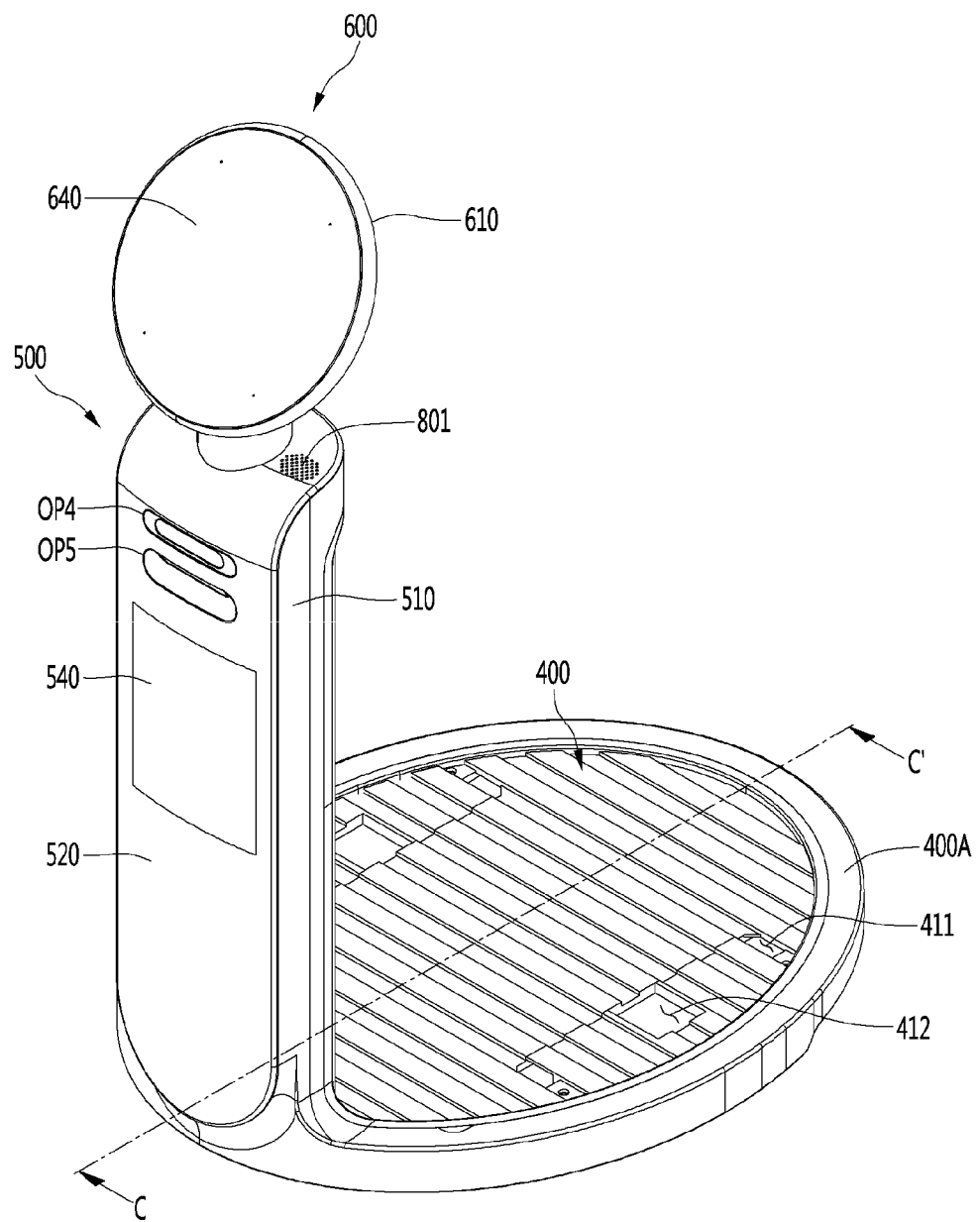

【Figure 6】
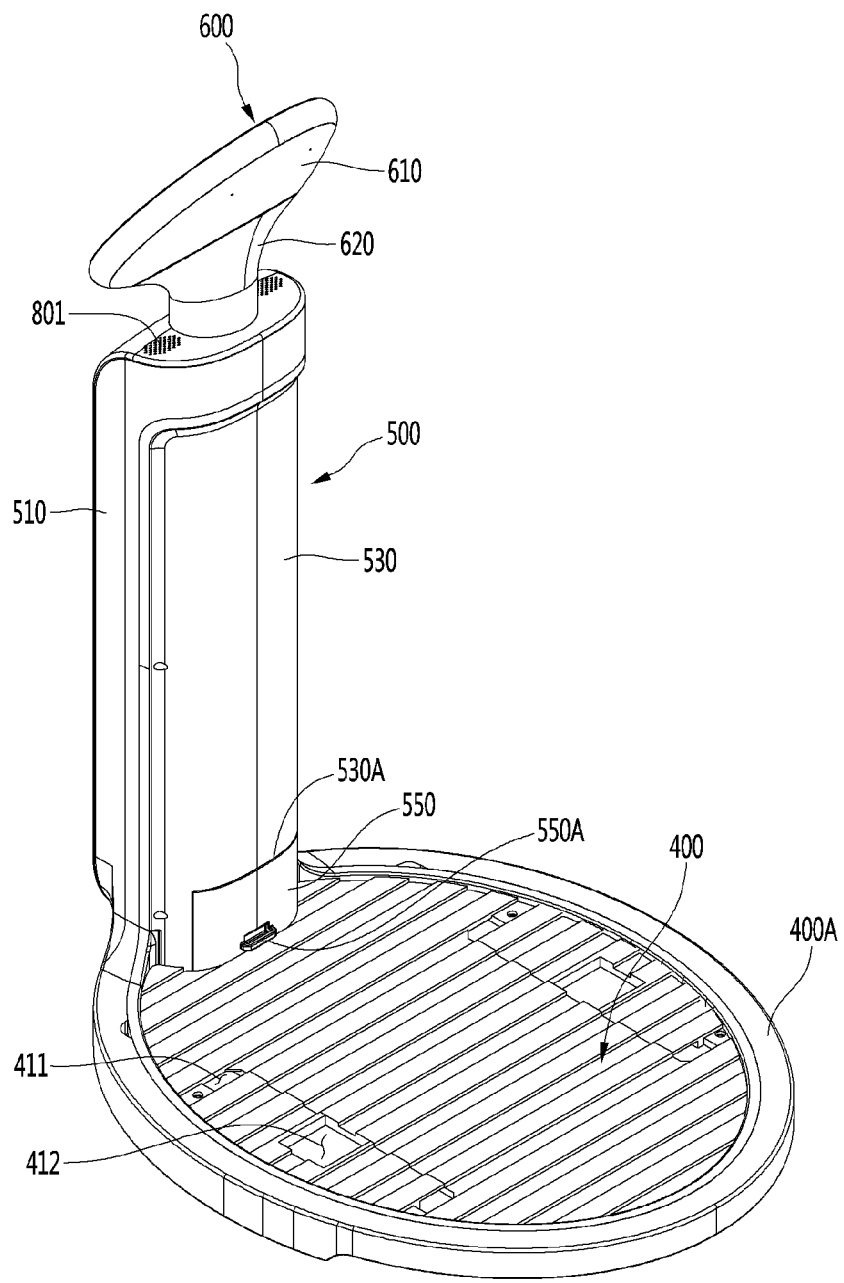

【Figure 7】
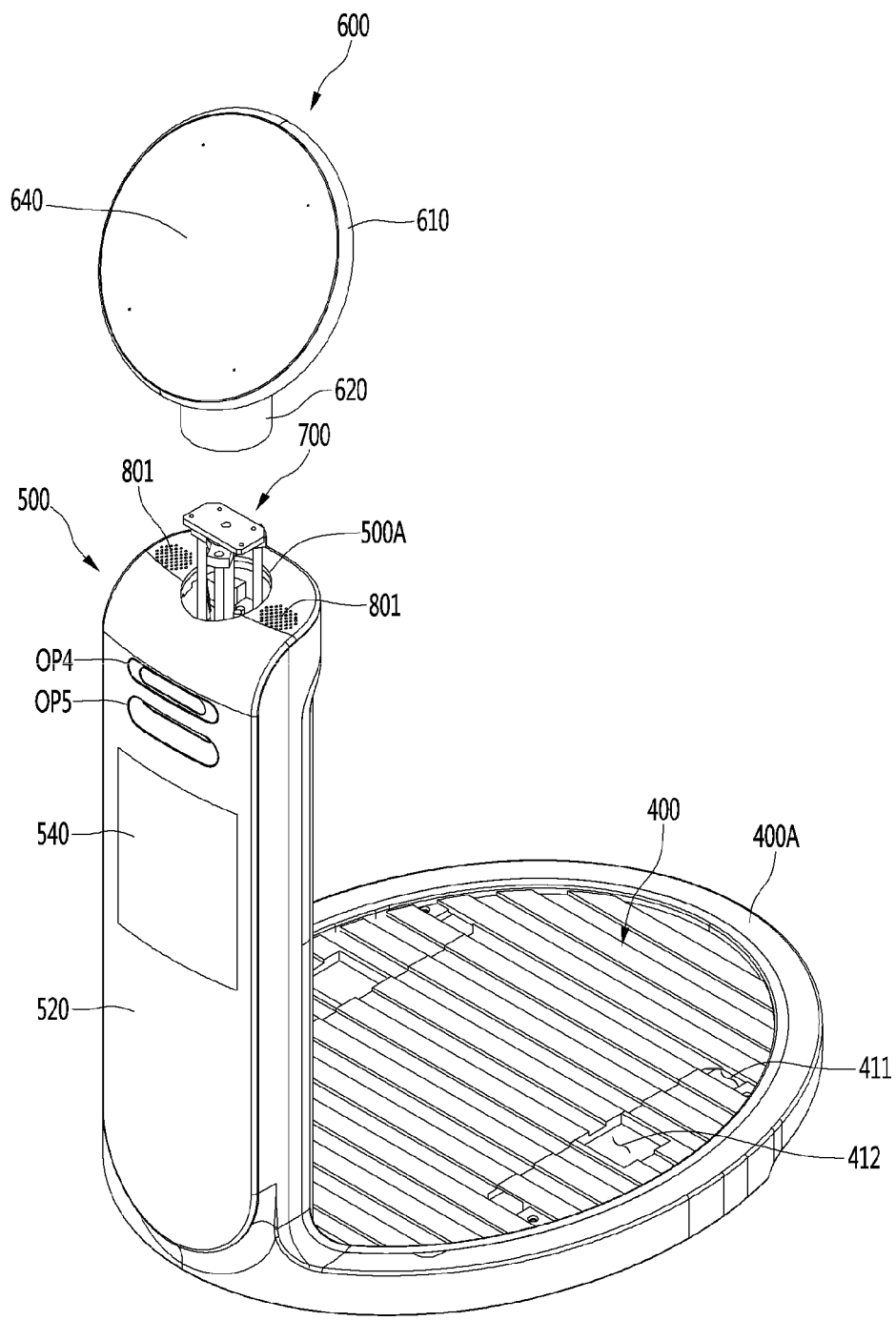

【Figure 8】
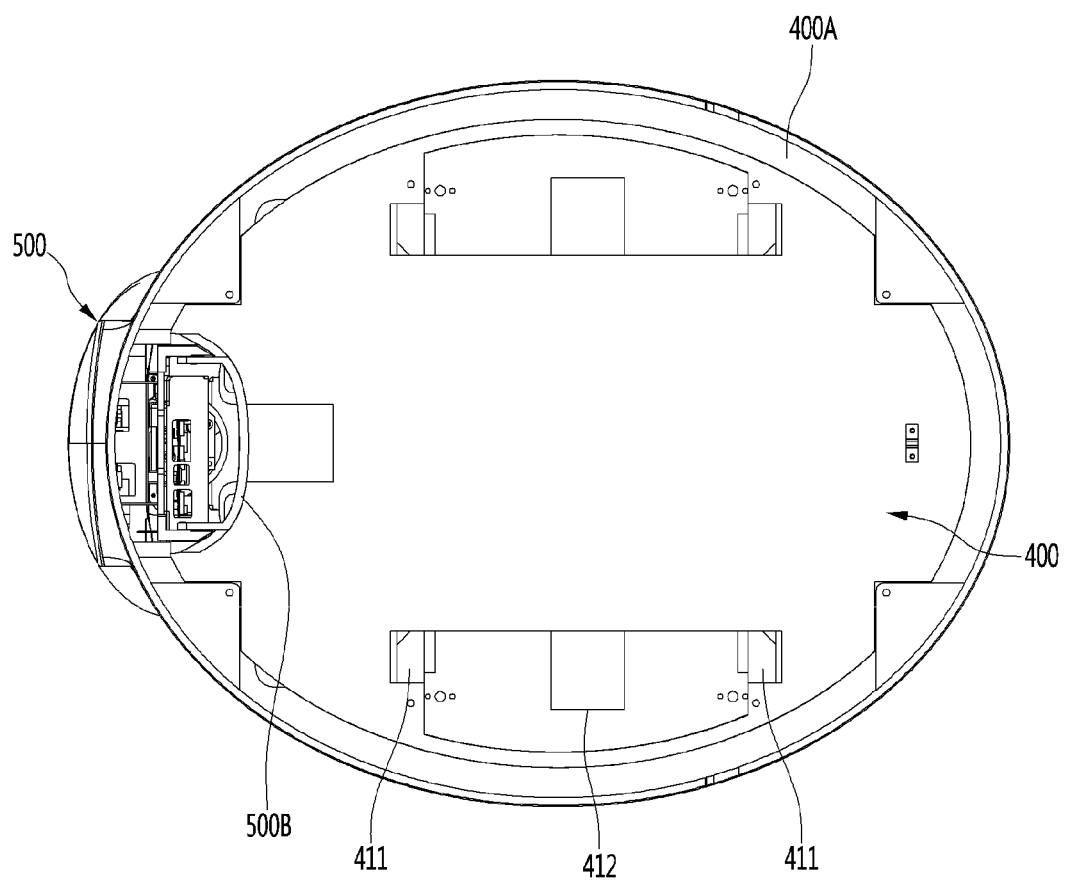

【Figure 9】
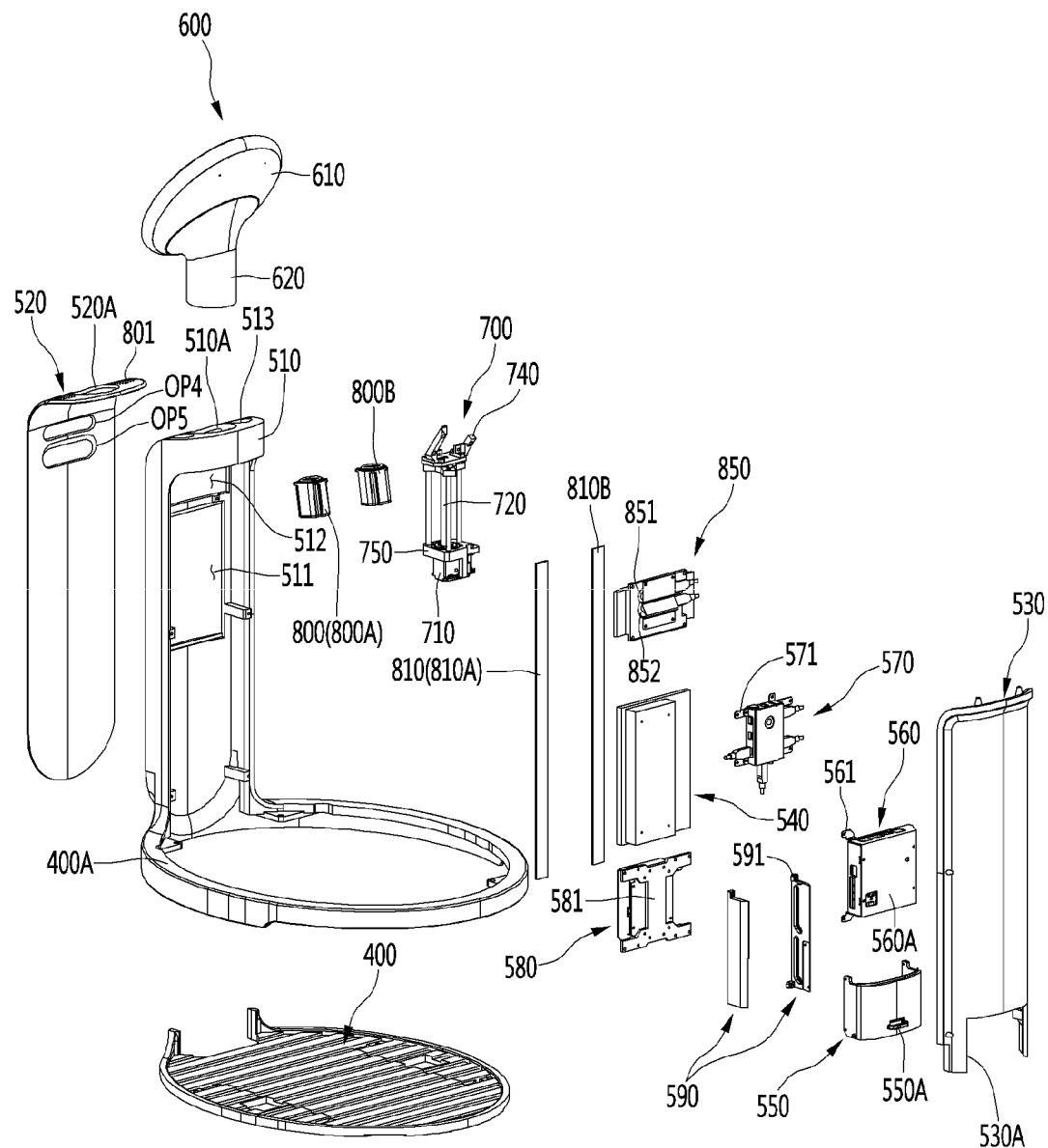

[Figure 10]
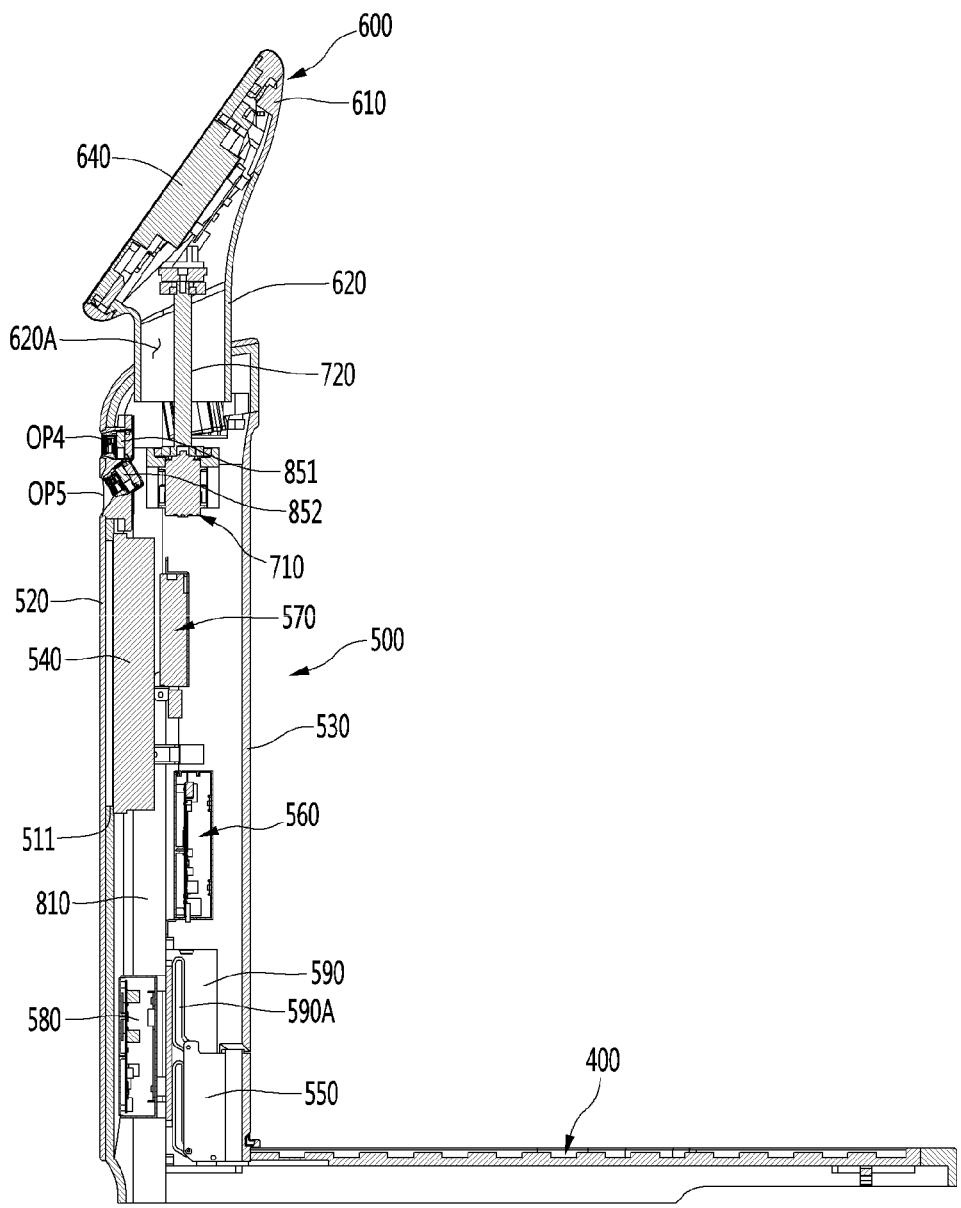

[Figure 11]
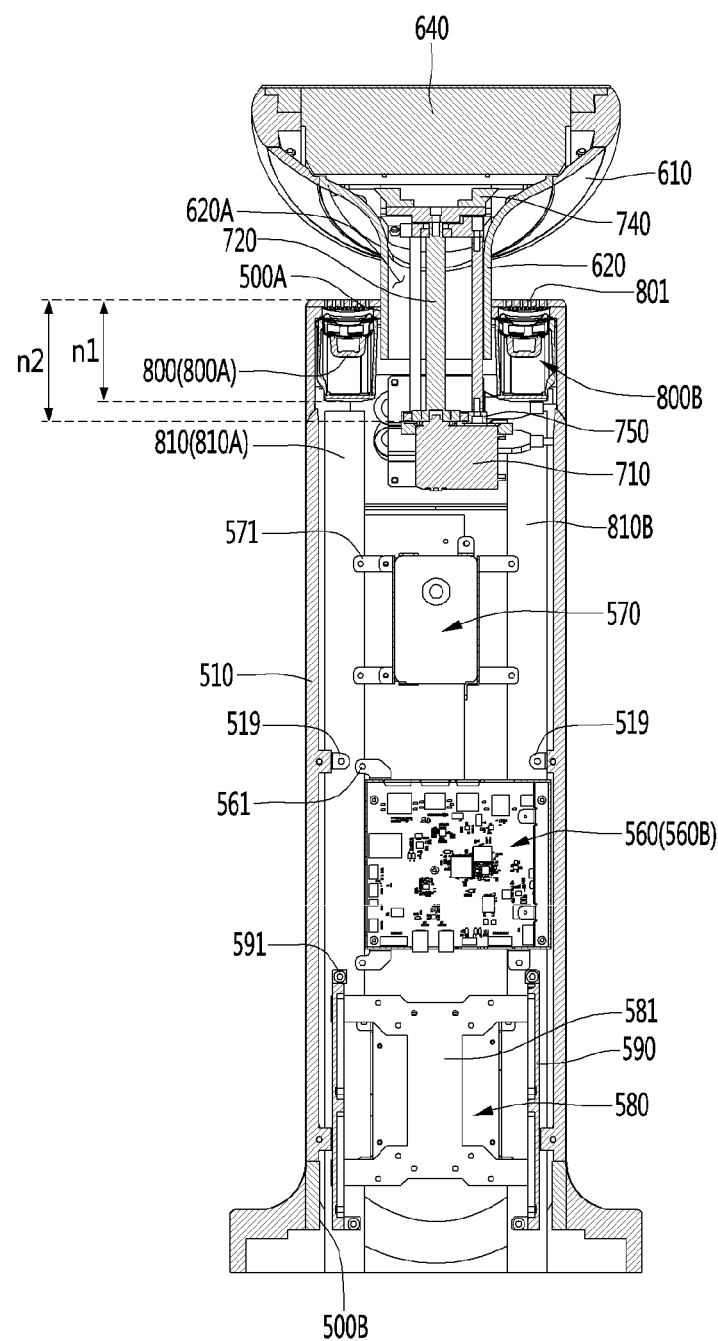

[Figure 12]
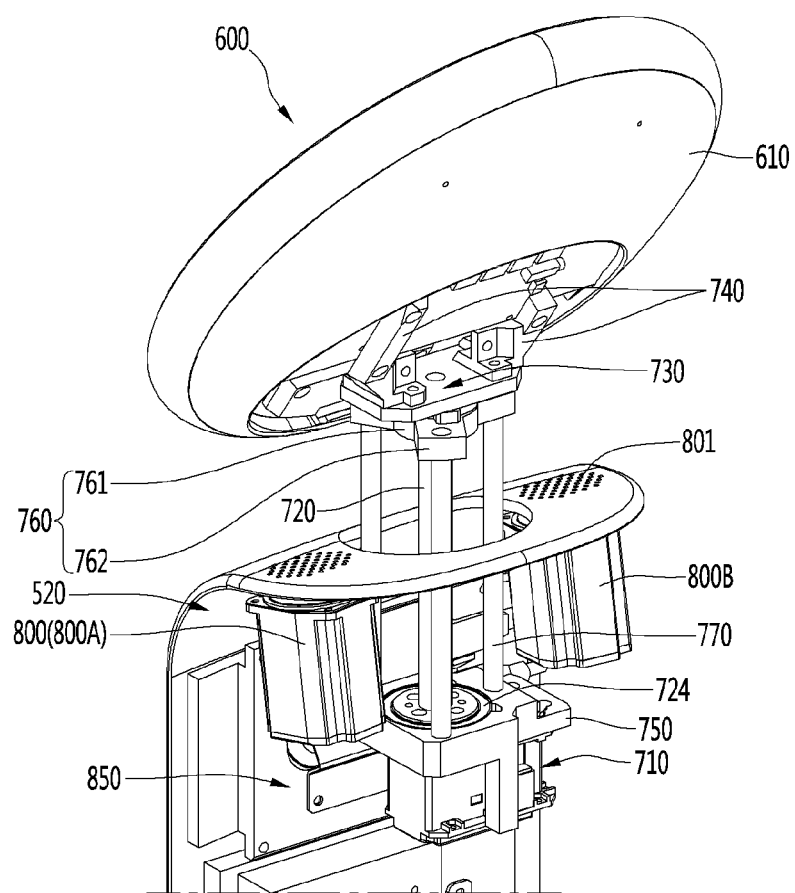

[Figure 13]
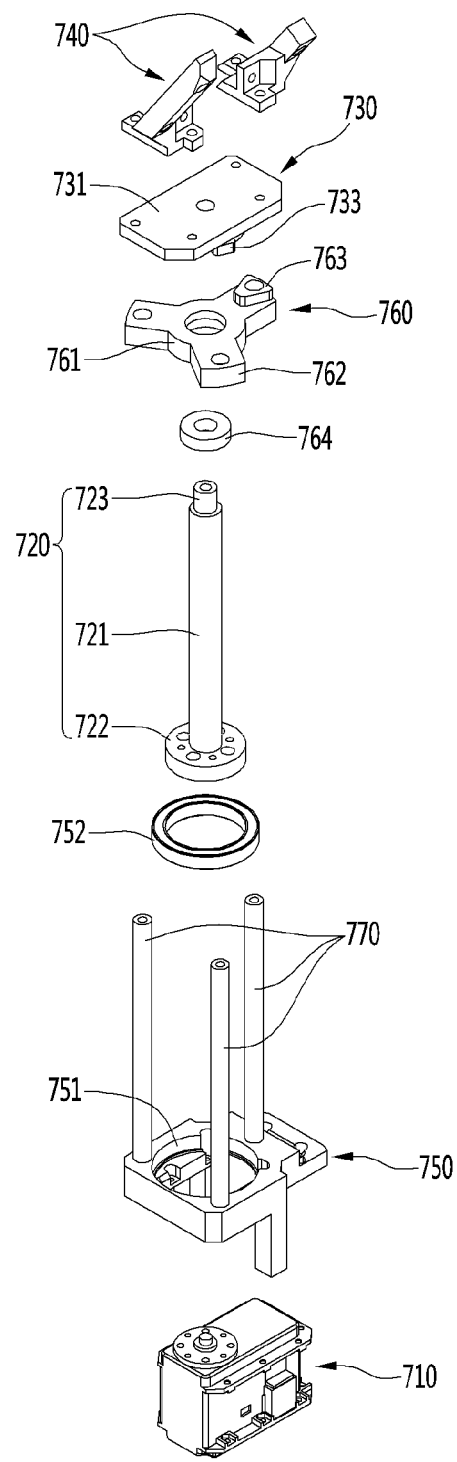

[Figure 14]
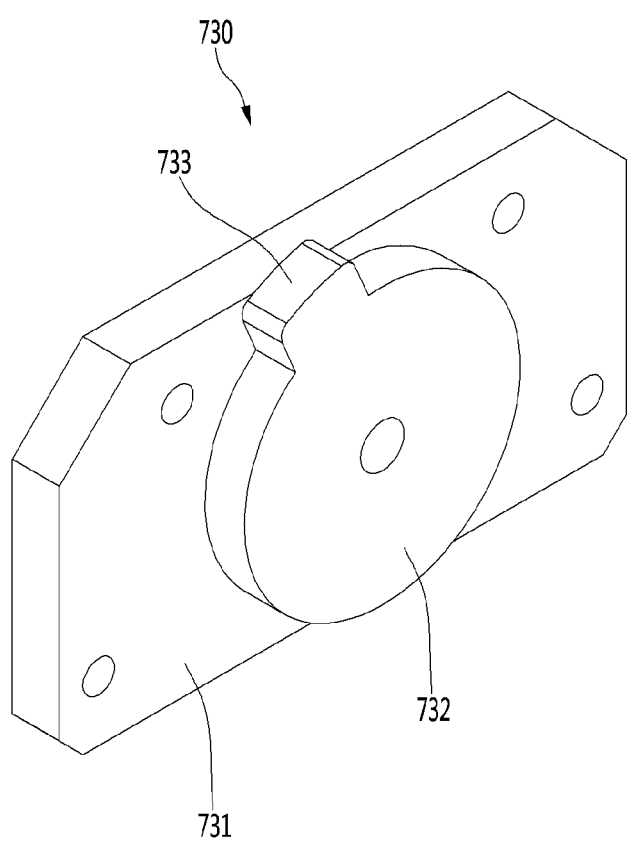

11,858,129 B2

MOBILE ROBOT

CROSS REFERENCE TO RELATED APPLICATIONS

This application is the National Phase of PCT/KR2019/000052 filed on Jan. 2, 2019, which is hereby expressly incorporated by reference into the present application.

TECHNICAL FIELD

The present disclosure relates to a mobile robot capable of autonomous driving.

BACKGROUND ART

Robots have been developed for industrial use to take part in factory automation. In recent years, the field of application of robots is expanding, and robots that can be used in daily life have been developed in addition to medical robots and aerospace robots.

The robots for daily life provide a specific service (e.g., shopping, serving, conversation, cleaning, or the like) in response to a user's command.

However, an existing robot for daily life is designed to provide only a specific service, and thus there is a problem in that utilization is not high compared to costs invested in developing the robot.

Accordingly, a need for a robot that can provide various services has recently emerged.

DISCLOSURE

Technical Problem

An object of the present disclosure is to provide a mobile robot having a thin and compact display unit.

Another object of the present disclosure is to provide a mobile robot having a robust display unit.

Technical Solution

According to an embodiment of the present disclosure, a mobile robot may include a body provided with a driving unit, a body display unit positioned on an upper side of a front portion of the body, extending vertically, and provided with a display on a front surface thereof, a supporter extending vertically inside the body display unit and having a lower end supported by the body, and an interface module supported by the supporter and electrically connected to the display.

A lower opening portion through which the supporter passes is defined at the lower end of the body display unit.

The mobile robot may further include an inner bracket configured to fasten the supporter with an inner surface of the body display unit.

The interface module may include a module case fastened to the supporter, and an interface printed circuit board embedded in the module case.

The mobile robot may further include a head display unit rotatably connected to an upper portion of the body display unit, a rotating motor disposed inside the body display unit, a rotating shaft connected to the rotating motor and extending vertically to rotate the head display unit, and a motor mounter on which the rotating motor is mounted, the motor mounter being supported by the supporter.

The load of the head display unit may be supported by the supporter.

The mobile robot may further include at least one speaker disposed inside the body display unit, spaced apart from the motor mounter, and supported by the body display unit The speaker may be spaced apart from the supporter.

A vertical distance from a top surface of the body display unit to the rotating motor or the supporter may be longer than a vertical distance from the top surface of the body display unit to a bottom surface of the speaker.

The mobile robot may further include an audio unit disposed inside the body display unit and electrically connected to the speaker, and the audio unit may be supported by the supporter.

The mobile robot may further include a shaft support portion configured to rotatably support the rotating shaft in a horizontal direction, and a supporting shaft extending vertically between the shaft support portion and the motor mounter.

The supporting shaft may be provided in plural.

The shaft support portion may include an annular portion penetrated by the rotating shaft, and a plurality of protrusions protruding from the annular portion in a radially outward direction, and the supporting shaft may be connected to the protrusions.

The mobile robot may further include a module support plate configured to support a service module, disposed behind the body display unit, from a lower side and mounted on the body, and a plate mounting portion on which the module support plate is mounted, and the plate mounting portion may be connected to the body display unit.

The mobile robot may further include a hub unit disposed inside the body display unit and electrically connected to the interface module, and wherein the hub unit may be supported by the supporter.

According to an embodiment of the present disclosure, a mobile robot may include a body provided with a driving unit, a body display unit disposed on an upper side of a front portion of the body, extending vertically, and provided with a display on a front surface thereof, a head display unit rotatably connected to an upper portion of the body display unit, a supporter extending vertically inside the body display unit and having a lower end supported by the body, a rotating motor disposed inside the body display unit and supported by the supporter to rotate the head display unit, and a speaker disposed inside the body display unit and supported by the body display unit.

The speaker may be spaced apart from the rotating motor and the supporter respectively.

The head display unit may include a neck housing rotatably connected to the body display unit, and a head housing connected to the neck housing and spaced apart upward from the body display unit, the rotating motor may be positioned under the neck housing, and the speaker may be positioned beside the neck housing.

According to an embodiment of the present disclosure, a mobile robot may include a body provided with a driving unit, a body display unit positioned on an upper side of a front portion of the body, extending vertically, and supported by the body, a supporter extending vertically inside the body display unit and having a lower end supported by the body, and an inner bracket configured to fasten the supporter to an inner surface of the body display unit.

The supporter may be provided in plural, the plurality of supporters being spaced apart from each other left and right.

Advantageous Effects

According to a preferred embodiment of the present disclosure, the interface module disposed inside the body display unit may be supported by the supporter. In this case, the lower end of the supporter may be supported by the body. Therefore, the load of the interface module may not be applied to the body display unit or may be distributed. Accordingly, the body display unit may be formed to be thin and compact.

In addition, a lower opening portion through which the supporter passes may be formed in the lower end of the body display unit. Thus, the lower end of the supporter extending inside the body display unit may be easily supported by the body.

In addition, the inner bracket may fasten the inner surface of the body display unit and the supporter. Thereby, the body display unit may be reinforced and solidified, and the load applied to the body display unit may be distributed to the supporter.

In addition, the module case of the interface module may be fastened to the supporter. Thereby, the position of the interface module may be fixed and be stably supported by the supporter.

Further, the motor mounter on which the rotating motor is mounted may be supported by the supporter. Therefore, the load of the rotating mechanism including the rotating motor may not be applied to or may be distributed to the body display unit. Accordingly, the body display unit may be formed to be thinner and more compact.

In addition, the head display unit may be supported by the load. Therefore, the load of the head display unit may not be applied to the body display unit or may be distributed. Accordingly, the body display unit may be formed to be thinner and more compact.

In addition, the speaker may be spaced apart from the motor mounter and the supporter and may be supported by the body display unit. On the other hand, the rotating motor may be supported by the supporter. Thereby, it is possible to prevent the vibration of the rotating motor and the vibration of the speaker from causing resonance.

Further, the speaker may be installed at a higher position than the rotary motor and supporter. As a result, the adverse effect of rotation and vibration of the rotating motor on the speaker may be minimized, and sound may be better transmitted to the user.

Further, the audio unit electrically connected to the speaker may be supported by the supporter. Therefore, the load of the audio unit may not be applied to the body display unit or may be distributed. Accordingly, the body display unit may be formed to be thinner and more compact.

Further, the shaft support portion rotatably supporting the rotating shaft with respect to the horizontal direction may be fixed by the supporting shaft. In this case, the lower end of the supporting shaft may be connected to the motor mounter supported by the supporter. Thereby, the rotating shaft may be reinforced and the load of the head display unit may be stably transmitted to the supporter.

Also, a plurality of supporting shafts may be provided. Thereby, the rotating shaft may be reinforced more firmly.

In addition, the shaft support portion may include an annular portion through which the rotating shaft passes, and a protrusion protruding from the annular portion in an radially outward direction. In this case, the supporting shaft may be connected to the protrusion. Therefore, the size of the annular portion may be made compact while the supporting shaft and the rotating shaft are be sufficiently spaced apart from each other. Accordingly, a space through which an electric wire or a housing passes may be secured inside the neck housing which is compact.

In addition, the plate mounting portion on which the module support plate is mounted may be connected to the body display unit. Accordingly, the body display unit may be securely fixed, and the load or moment applied to the body display unit may be distributed to the plate mounting portion.

In addition, the hub unit disposed inside the body display unit may mediate connection between electronic components. Accordingly, it is possible to facilitate electrical connection between the electronic components and simplify the arrangement of electric wires or harnesses in the body display unit.

Also, the hub unit may be supported by a supporter. Therefore, the load of the hub unit may not be applied to the body display unit or distributed. Accordingly, the body display unit may be formed to be thinner and more compact.

Further, the rotating motor may be positioned below the neck housing. As a result, the neck housing can be formed thinner compared to a case where the rotating motor is positioned inside the neck housing.

In addition, the speaker may be disposed on the side of the neck housing. As a result, it is possible to minimize the adverse effect on the speaker due to rotation and vibration of the rotating shaft passing through the interior of the neck housing. Therefore, it is possible to provide an improved sound experience to the user.

In addition, a plurality of supporters spaced apart from each other left and right may be provided. Thus, the components supported by the supporter may be supported more stably.

DESCRIPTION OF DRAWINGS

FIG. 1 is a perspective view of a mobile robot according to an embodiment of the present disclosure.

FIG. 2 is a perspective view of a service module mounted to a mobile robot according to an embodiment of the present disclosure.

FIG. 3 is an exploded perspective view of a mobile robot according to an embodiment of the present disclosure.

FIG. 4 is a cross-sectional view taken along line A-A' in FIG. 1.

FIG. 5 is a perspective view of a display unit and a module support plate according to an embodiment of the present disclosure.

FIG. 6 is a perspective view of a display unit and a module support plate according to an embodiment of the present disclosure as viewed from different directions.

FIG. 7 is a view illustrating a body display unit and a head display unit which are separated from each other, according to an embodiment of the present disclosure.

FIG. 8 is a bottom view of a display unit and a module support plate according to an embodiment of the present disclosure.

FIG. 9 is an exploded perspective view of a display unit and a module support plate according to an embodiment of the present disclosure.

FIG. 10 is a cross-sectional view taken along line C-C' in FIG. 5.

FIG. 11 is a view showing the interior of a display unit according to an embodiment of the present disclosure.

FIG. 12 is a view showing a rotation mechanism according to an embodiment of the present disclosure.

FIG. 13 is an exploded perspective view of a rotation mechanism according to an embodiment of the present disclosure.

FIG. 14 is a view showing a bottom surface of a shaft connecting body according to an embodiment of the present disclosure.

MODE FOR INVENTION

Hereinafter, specific embodiments of the present disclosure will be described in detail with reference to the drawings.

FIG. 1 is a perspective view of a mobile robot according to an embodiment of the present disclosure, FIG. 2 is a perspective view of a service module mounted to a mobile robot according to an embodiment of the present disclosure, and FIG. 3 is an exploded perspective view of a mobile robot according to an embodiment of the present disclosure.

A mobile robot 1 according to the embodiment of the present disclosure may include a body 100, a driving unit 240, a module support plate 400, a display unit 500 and 600, and a rotation mechanism 700.

The body 100 may constitute the body portion of the mobile robot 1.

A length of the body 100 in the front-rear direction may be longer than a width of the body 100 in the left-right direction. As an example, the cross-section of the body 100 in a horizontal direction may have an approximately elliptical shape.

The body 100 may include an inner module 200 and a housing 300 surrounding the inner module 200.

The inner module 200 may be positioned inside the housing 300. The driving unit 240 may be provided with the inner module 200 in a lower portion thereof.

The inner module 200 may include multiple plates and multiple frames. In more detail, the inner module 200 may include a lower plate 210, an upper plate 220 positioned above the lower plate 210, and a top plate 230 positioned above the upper plate 220. In addition, the inner module 200 may further include a plurality of lower supporting frames 250 and a plurality of upper supporting frames 260.

The lower plate 210 may form a bottom surface of the body 100. The lower plate 210 may be referred to as a base plate. The lower plate 210 may be horizontal. The lower plate 210 may be provided with the driving unit 240.

The upper plate 220 may be spaced apart upward from the lower plate 210. The upper plate 220 may be referred to as a middle plate. The upper plate 220 may be horizontal. The upper plate 220 may be positioned between the lower plate 210 and the top plate 230 in the vertical direction.

The lower supporting frame 250 may be positioned between the lower plate 210 and the upper plate 220. The lower supporting frame 250 may be extending vertically. The lower supporting frame 250 may support the upper plate 220 from the lower side.

The top plate 230 may form a top surface of the body 100. The top plate 230 may be spaced upward from the upper plate 220.

The upper supporting frame 260 may be positioned between the upper plate 220 and the top plate 230. The upper supporting frame 260 may be extending vertically. The upper supporting frame 260 may support the top plate 230 from the lower side.

The housing 300 may form an outer peripheral surface of the main body 100. A space in which the inner module 200 is disposed may be formed inside the housing 300. The top and bottom surfaces of the housing 300 may be opened.

The housing 300 may surround the edges of the lower plate 210, the upper plate 220, and the top plate 230. In this case, an inner periphery of the housing 300 may be in contact with the edges of the lower plate 210, the upper plate 220, and the top plate 230, but is not limited thereto.

A front open portion OP1 may be formed in a front portion of the housing 300. The front open portion OP1 may be opened toward the front. The front open portion OP1 may be extending along the peripheral direction of the housing 300. A front lidar 275A may detect an obstacle or the like positioned in front of the mobile robot 1 through the front open portion OP1 or perform mapping for a front region of the mobile robot 1.

A rear open portion OP2 may be formed in a rear portion of the housing 300. The rear open portion OP2 may be opened toward the rear. The rear open portion OP2 may be extending along the peripheral direction of the housing 300. The rear lidar 275B (see FIG. 4) may detect an obstacle or the like positioned behind the mobile robot 1 through the rear open portion OP2 or perform mapping for a rear region of the mobile robot 1. In addition, a back cliff sensor 276B (see FIG. 4) may detect a state of a floor surface behind the mobile robot 1 through the rear open portion OP2.

An upper open portion OP3 may be formed in the front portion of the housing 300. The upper open portion may be formed above the front open portion OP1. The upper open portion OP3 may be opened toward the front side or a front lower side. The cliff sensor 276A may detect the state of the floor surface in front of the mobile robot 1 through the upper open portion OP3.

A plurality of openings 303A may be formed in the housing 300. In more detail, the opening 303A may be formed in the top portion of the housing 300. The plurality of openings 303A may be spaced apart from each other along the peripheral direction of the housing 300. Each ultrasonic sensor 310 may detect an object around the mobile robot 1 through the opening 303A.

The housing 300 may include a material having a first thermal conductivity, and the inner module 200 may include a material having a second thermal conductivity higher than the first thermal conductivity. In more detail, at least one of the lower plate 210, the upper plate 220, the top plate 230, the lower supporting frame 250 and the upper supporting frame 260 may include a material having a second thermal conductivity higher than the first thermal conductivity.

As an example, the housing 300 may include an injection plastic material, and at least one of the lower plate 210, the upper plate 220, the top plate 230, the lower supporting frame 250 and the upper supporting frame 260 may include a metal material such as aluminum.

Accordingly, a heat dissipation part disposed in the inner module 200 may be smoothly dissipated by conduction while preventing the housing 300 forming the appearance of the body 100 from becoming hot.

The driving unit 240 may enable the mobile robot 1 to move. The driving unit 240 may be provided below the body 100. In more detail, the driving unit 240 may be provided in the lower plate 210.

On the other hand, the module support plate 400 may be mounted on the top surface of the body 100. The module support plate 400 is preferably a horizontal plate shape, but is not limited thereto.

Like the body 100, the module support plate 400 may be extending such that a length in the front-rear direction is longer than a width in the left-right direction.

The module support plate 400 may support a service module M from the lower side. That is, the service module M may be seated and supported on the module support plate 400.

The service module M may be detachably mounted to the module support plate 300.

In this case, the mobile robot 1 of the present disclosure may be referred to as a "mobile module", and the entire configuration including the mobile module 1 and the service module M may also be referred to as a "mobile robot". However, to avoid confusion in the description, these names should not be used below.

The service module M may be a transport object carried by the mobile robot 1, and its type is not limited. Therefore, there is an advantage that it is possible to mount and use different service modules M to the same mobile robot 1.

As an example, the service module M may be a cart capable of receiving items. In this case, the mobile robot 1 equipped with a cart may be used in a mart, and a user has an advantage of not having to push the cart directly.

The top surface of the body 100, that is, the top plate 230 may be provided with at least one of at least one module guide 231 configured to guide the installation position of the service module M and at least one module fastening portion 232 fastened to the service module M.

The module guide 231 and the module fastening portion 232 may protrude upward from the top plate 230.

The module guide 231 may pass through a sub-through hole 411 formed in the module support plate 400, and prevent the service module M from shaking in the horizontal direction while guiding the installation position of the service module M.

The module fastening portion 232 may pass through the sub-opening hole 412 formed in the module support plate 400 and be fastened to the service module M. Therefore, the service module M may be firmly mounted to the upper side of the module support plate 400.

The module guide 231 and the module fastening portion 232 may also be used as handles when carrying the mobile robot 1.

Meanwhile, the display unit 500 and 600 may be positioned above the front portion of the main body 100. The display units 500 and 600 may be disposed to extend vertically. A height HD of the display unit 500 and 600 (see FIG. 4) may be higher than a height HB of the body 100.

In more detail, the display unit 500 and 600 may include a body display unit 500 and a head display unit 600.

The body display unit 500 may be integrally formed with the module support plate 400. In this case, the body display unit 500 may be formed to extend upward from the front end of the module support plate 400. However, it is of course possible that the body display unit 500 and the module support plate 400 are formed of separate members.

A height of the body display unit 500 may be higher than a height of the body 100.

The body display unit 500 may include a body display 540 provided on a front surface thereof. The body display 540 may function as an output unit on which an image or video is displayed. At the same time, the body display 540 may include a touch screen to function as an input unit capable of enabling touch input.

The body display unit 500 may be positioned in front of the service module M mounted on the module support plate 400. In this case, a groove corresponding to a shape of the body display unit 500 may be formed in the front portion of the service module M, and the body display unit 500 may be fitted into the groove. That is, the body display unit 500 may guide a mounting position of the service module M.

The head display unit 600 may be positioned above the body display unit 500. The head display unit 600 may be rotatably connected to an upper portion of the body display unit 500.

In more detail, the head display unit 600 may include a neck housing 620 rotatably connected to the body display unit 500. The rotation mechanism 700 may rotate the head display unit 600 through the interior of the neck housing 620.

The head display unit 600 may include a head display 640 provided on a front surface thereof. The head display 600 may face the front side or a front upper side. The head display 640 may display an image or video depicting a human expression. Accordingly, the user may feel that the head display unit 600 is similar to a human head.

The head display unit 600 may rotate a certain range (for example, 180 degrees) left and right with respect to the vertical axis of rotation, like a human head.

The rotation mechanism 700 may rotate the head display unit 600 with respect to the body display unit 500. The rotation mechanism 700 may include a rotating motor and a rotating shaft rotated by the rotating motor. The rotating motor may be disposed inside the body display unit 500, and the rotating shaft may extend from the interior of the body display unit 500 into the neck housing 620 and be connected to the head display unit 600.

FIG. 4 is a cross-sectional view taken along line A-A' in FIG. 1;

A battery 271 and a control box 272 may be embedded in the body 100. Further, the body 100 may include a front lidar 275A and a rear lidar 275B embedded therein.

Electric power for the operation of the mobile robot 1 may be stored in the battery 271.

The battery 271 may be supported by the upper plate 220 of the inner module 200. The battery 271 may be disposed between the upper plate 220 and the top plate 230.

The battery 271 may be disposed eccentrically from the interior of the body 100 to the rear.

Also, the display unit 500 and 600 may be supported by the top plate 230 of the inner module 200. The display unit 500 and 600 may be disposed above the front portion of the top plate 230. The body display unit 400 may not overlap the battery 271 in the vertical direction.

With the above configuration, the load of the battery 271 and the load of the body display unit 500 and the head display unit 600 may be balanced. Thereby, it is possible to prevent the mobile robot 1 from being tilted or overturned back and forth.

The control box 272 may be disposed in front of the battery 271. The control box 272 may be supported by the upper plate 220 of the inner module 200. The control box 272 may be disposed between the upper plate 220 and the top plate 230. At least a portion of the control box 272 may overlap the display unit 500 and 600 vertically.

The control box 272 may include a box-shaped boxing case and a controller provided in the boxing case. A plurality of through holes may be formed in the boxing case to dissipate internal heat of the control box 272. The controller may include a printed circuit board, and may control the overall operation of the mobile robot 1.

Since the control box 272 is positioned in front of the battery 271, the load of the battery 271 eccentric to the rear and the load of the control box 272 may be balanced. Thereby, it is possible to prevent the mobile robot 1 from being tilted or overturned back and forth.

The front lidar 275A and the rear lidar 275B may be provided in the front and rear portions of the body 100, respectively.

LIDAR is a sensor capable of detecting a distance and various properties of an object by radiating a laser beam to a target and the front lidar 275A and the rear lidar 275B may detect surrounding objects, terrain features, and the like. A controller of the control box 272 may receive information detected by the front lidar 275A and the rear lidar 275B, and perform 3D mapping or control the driving unit 240 to avoid an obstacle based on the information.

As described above, the front lidar 275A may detect information on a front region of the mobile robot 1 through the front open portion OP1 formed in a front portion of the body 100. The rear lidar 275B may detect information on a rear region of the mobile robot 1 through the rear open portion OP2 formed in a rear portion of the body 100.

At least a portion of the front lidar 275A may be positioned below the control box 272.

The front lidar 275A and the rear lidar 275B may be positioned at the same height inside the body 100.

In more detail, a vertical distance H1 from the bottom surface of the body 100 to the front lidar 275A may be equal to a vertical distance H2 from the bottom surface of the body 100 to the rear lidar 275B.

In addition, the front lidar 275A and the rear lidar 275B may be disposed inside the body 100 at a lower position than the battery 271.

The front lidar 275A and the rear lidar 275B may be supported by the lower plate 210 of the inner module 200. The front lidar 275A and the rear lidar 275B may be disposed between the lower plate 210 and the upper plate 220.

In more detail, a vertical distance H3 from the bottom surface of the body 100 to the battery 271 may be greater than the vertical distance H1 from the bottom side of the body 100 to the front lidar 275A. In addition, the vertical distance H3 from the bottom surface of the main body 100 to the battery 271 may be greater than the vertical distance H2 from the bottom surface of the body 100 to the rear lidar 275B.

As a result, a space inside the body 100 may be effectively utilized as compared with a case where the front lidar 275A and the rear lidar 275B are disposed at the same height as the battery 271. Therefore, the size of the body 100 may be made compact.

A cliff sensor 276A and a back cliff sensor 276B may be embedded in the body 100.

The cliff sensor 276A and the back cliff sensor 276B may be supported by being suspended from the top plate 230 of the inner module 200. The cliff sensor 276A and the back cliff sensor 276B may be disposed between the upper plate 220 and the top plate 230.

The cliff sensor may detect a state of the floor surface and the presence or absence of a cliff by transmitting and receiving infrared rays. That is, the cliff sensor 276A and the back cliff sensor 276B may detect the state of the floor surface of the front and rear regions of the mobile robot 1 and the presence or absence of a cliff. The controller of the control box 272 may receive information detected by the cliff sensor 276A and the back cliff sensor 276B, and control the driving unit 240 such that the mobile robot 1 avoids cliffs based on the information.

As described above, the cliff sensor 276A may detect the state of the floor surface in front of the mobile robot 1 through the upper open portion OP3. The back cliff sensor 276B may detect the state of the floor surface behind the mobile robot 1 through the rear open portion OP2.

The cliff sensor 276A may be disposed above the front lidar 275A. The back cliff sensor 276B may be disposed above the rear lidar 276B.

At least a portion of the cliff sensor 276A may be positioned above the control box 272. The back cliff sensor 276B may be positioned behind the battery 271.

That is, the cliff sensor 276A may be disposed within the body 100 at a higher position than the back cliff sensor 276B.

In more detail, a vertical distance H4 from the bottom surface of the body 100 to the cliff sensor 276A may be greater than a vertical distance H5 from the bottom surface of the body 100 to the back cliff sensor 276B.

As a result, a space inside the body 100 may be efficiently utilized as compared with a case where the cliff sensor 276A is positioned in front of the control box 272. Therefore, the body 100 may be compact with respect to the front-rear direction.

Meanwhile, a wiring disconnect switch 277 may be embedded in the body 100. The wiring disconnect switch 277 may cut off the power of the mobile robot 1 to immediately stop driving of the mobile robot 1.

The wire disconnect switch 277 may be positioned behind the front lidar 275A. The wire blocking switch 277 may be supported by the lower plate 210 of the inner module 200.

FIG. 5 is a perspective view of a display unit and a module support plate according to an embodiment of the present disclosure, FIG. 6 is a perspective view of a display unit and a module support plate according to an embodiment of the present disclosure as viewed from different directions, FIG. 7 is a view illustrating a body display unit and a head display unit which are separated from each other, according to an embodiment of the present disclosure, and FIG. 8 is a bottom view of a display unit and a module support plate according to an embodiment of the present disclosure.

As described above, the display unit 500 and 600 may include a body display unit 500 extending vertically and a head display unit 600 rotatably connected to an upper portion of the body display unit 500.

A first cover open portion OP4 and a second cover open portion OP5 may be formed in a front surface of the body display unit 500.

The first cover open portion OP4 may be opened toward the front. A depth camera 851 (see FIG. 10) may detect a distance between a person and an obstacle positioned in front of the mobile robot through the first cover open portion OP4. In addition, the depth camera 851 may perform a face recognition camera function of recognizing a face of a person positioned in front of the mobile robot 1.

The second cover open portion OP5 may be formed on the lower side of the first cover open portion OP4. The second cover open portion OP5 may be opened toward a front lower side. The upper cliff sensor 852 (see FIG. 10) may detect a state of the floor surface in front of the mobile robot 1 through the second cover open portion OP5. In this case, the upper cliff sensor 852 may detect a state of the floor surface positioned in front of the mobile robot 1 in a wider range than the cliff sensor 276A described above. On the other hand, the cliff sensor 276A may detect the state of the floor surface in front of the mobile robot 1 more precisely than the upper cliff sensor 852.

A sound hole 801 may be formed in the body display unit 500. The sound of a speaker (see FIG. 12) positioned inside the body display unit 500 may be emitted to the outside of the mobile robot 1 through the sound hole 801.

The sound hole 801 may be formed in the top surface of the body display unit 500. The sound hole 801 may be formed on the left or right side of a neck insertion opening 500A into which the neck housing 620 of the head display unit 600 is inserted. Accordingly, the body display unit 500 may be formed to be compact in the front-rear direction as compared to a case where the sound hole 801 is formed in front or rear of the neck insertion opening 500A.

A neck insertion opening 500A may be formed in the upper portion of the body display unit 500. The neck insertion opening 500A may be formed by vertically penetrating the top surface of the body display unit 500. The neck housing 620 of the head display unit 600 may be inserted into the neck insertion opening 500. In addition, the upper portion of the rotation mechanism 700 may protrude upward from the neck insertion port 500 and may be introduced into the neck housing 620.

A lower opening portion 500B may be formed in a lower portion of the body display unit 500. The lower opening portion 500B may be formed by opening a bottom surface of the body display unit 500. An electric wire or harness connected to the body 100 may be connected to the interior of the body display unit 500 through the lower opening portion 500B. In addition, the supporter 810 (see FIG. 11) disposed vertically inside the body display unit 500 may pass through the lower opening portion 500B and be supported by the body 100.

A rear opening portion 530A may be formed in a rear surface of the body display unit 500. In more detail, the rear opening portion 530A may be formed in a lower rear surface of the body display unit 500. The electric wire or harness connected to the service module M (see FIG. 2) may be connected to the interior of the body display unit 500 through the rear opening portion 530A. The rear opening portion 530A may be opened and closed by a shutter 550.

A handle 550A may be formed on the shutter 550. The handle 550A may be formed to protrude rearward from the lower rear surface of the shutter 550.

An operator may hold the handle 550A and push the shutter 550 upward to open the rear opening 530 and connect the electric wire or harness connected to the service module M into the rear opening portion 530A. Thereafter, the operator may mount the service module M on the module support plate 400.

Conversely, the operator may separate the service module M from the module support plate 400 and the electric wire or harness connected to the service module M from the service module M. Thereafter, the operator may hold the handle 550A and push the shutter 550 downward to block the rear opening portion 530A.

The body display unit 500 may include a body housing 510, a front cover 520, a rear cover 530, and a body display 540.

The body housing 510 may form the appearance of the body display unit 500.

The body housing 510 may be formed with an interior space in which a plurality of parts including a body display 540 are accommodated. At least a portion of the rear surface of the body housing 510 may be opened, and the rear cover 530 may cover the open rear surface of the body housing 510. Therefore, the operator may easily access the interior space by opening the rear cover 530.

The plate mounting portion 400A on which the module support plate 400 is mounted may be connected to the body display unit 500. In one example, the body housing 510 may be integrally formed with the plate mounting portion 400A. However, it is not limited thereto.

The module support mounting portion 400A may have a ring shape corresponding to the shape of the module support plate 400. The body housing 510 may be formed to extend upward from the front end of the plate mounting portion 400A.

The front cover 520 may cover the body housing 510 and the body display 540 from the front. In more detail, the front cover 520 may cover the front and top surfaces of the body housing 510.

The front cover 520 may include a transparent material. The front cover 520 may function as a window of the body display 540.

A first cover open portion OP4 and a second cover open portion OP5 may be formed in the front surface of the front cover 520. A sound hole 801 may be formed in a top surface of the front cover 520.

The rear cover 530 may cover the open rear surface of the body housing 510. A rear opening portion 530A which is to be opened and closed by the shutter 550 may be formed on the lower side of the rear cover 530.

In addition, the lower portion of the rear cover 530 may form a lower opening portion 500B together with the lower portion of the body housing 510.

The body display 540 may display an image or a video toward the front. The body display 540 may be protected by the front cover 520. In addition, the body display 540 may function as an input unit including a touch screen to enable touch input.

Meanwhile, the head display unit 600 may be rotatably connected to the upper portion of the body display unit 500.

In more detail, the head display unit 600 may include a head housing 610, a neck housing 620, and a head display 640.

The head housing 610 may form the appearance of the head display unit 600. The head housing 610 may have a generally disc shape, but is not limited thereto.

The head housing 610 may be spaced apart upward from the body display unit 500.

The head housing 610 may include a front surface facing a front upper side and a rear surface facing a rear lower side. The front surface of the head housing 610 may include a flat surface, and may be covered by a glass cover including a transparent material. The rear surface of the head housing 610 may include a curved surface that is continuous with the outer surface of the neck housing 620.

The head housing 610 may rotate together with the neck housing 620.

The neck housing 620 may be referred to as a neck. The neck housing may have an approximately vertical hollow cylinder shape. That is, a hollow 620A through which the rotation mechanism 700 passes may be formed in the interior of the neck housing 620.

The neck housing 620 may be inserted into and rotatably connected to the neck insertion opening 500A formed in the upper portion of the body display unit 500.

The upper end of the neck housing 620 may be connected to the back surface of the head housing 610. Since the rear surface of the head housing 610 faces the rear lower side, the upper end of the neck housing 620 may be formed to be inclined in a direction in which a height increases toward the rear.

The neck housing 620 may be formed smaller than the head housing 610. As a result, the appearance of the mobile robot 1 is similar to that of the person, and the user may feel the familiarity.

The head display 640 may be provided on the front surface of the head housing 610. The head display 640 may be covered by a glass cover covering the front surface of the head housing. The head display 640 may face a front upper side.

The head display 640 may display an image or a video toward the upper front side. In addition, the head display 640 may function as an input unit capable of touch input by including a touch screen.

The size of the head display 640 may be smaller than the size of the body display 540. That is, the body display 540 may function as a main display, and the head display 640 may function as a secondary display.

FIG. 9 is an exploded perspective view of a display unit and a module support plate according to an embodiment of the present disclosure, FIG. 10 is a cross-sectional view taken along line C-C' in FIG. 5, and FIG. 11 is a view showing the interior of a display unit according to an embodiment of the present disclosure.

An interface module 560 may be disposed inside the body display unit 500.

The interface module 560 may be disposed inside the body display unit 500 at a lower position than the body display 540. In more detail, a vertical distance from the body 100 to the body display 540 may be higher than a vertical distance from the body 100 to the interface module 560.

The interface module 560 may include a box-shaped module case 560A and an interface controller 560B (see FIG. 11) embedded in the module case 560A.

At least one fastening bracket 561 fastened to the supporter 810 to be described later may be formed in the module case 560A. The fastening bracket 561 may be fastened to the supporter 810 at the rear side of the supporter 810. That is, the interface module 560 may be supported by the supporter 810.

The interface controller 560B may include an interface printed circuit board. The interface controller 560B may control a number of parts included or disposed in the display unit 500 and 600.

In one example, the interface controller 560B may control a video and an image displayed on the body display 540 and the head display 640. Also, the interface controller 560B may process a command input through a touch display included in at least one of the body display 540 and the head display 640. In addition, the interface controller 560B may control the rotation mechanism 700. In addition, the interface controller 560B may control an audio unit 580. The configuration controllable by the interface controller 560B is not limited thereto, and may be added, deleted, or changed.

A hub unit 570 may be disposed inside the body display unit 500.

The hub unit 570 may mediate connections between electronic components included in the mobile robot 1. The hub unit 570 may be formed with a plurality of slots to which connection terminals of an electric wire or harness are connected.

In one example, the control box 272 (see FIG. 4) and the interface module 560 may be connected to the hub unit 570 by electric wires or harnesses. In addition, at least one of the body display, the head display, the rotating motor 710, the depth camera 851, the upper cliff sensor 852, the audio unit 580, and the speaker 800 may be connected to the hub unit 570. Accordingly, electrical connection between each electronic component may be facilitated, and arrangement of electric wires or harnesses in the body display unit 500 may be simplified.

The hub unit 570 may be positioned behind the body display 540 and may be positioned above the interface module 560.

The hub unit 570 may be supported by the supporter 810. In more detail, at least one fastening bracket 571 fastened to the supporter 810 may be formed in the hub unit 570. The fastening bracket 571 may be fastened to the supporter 810 at the rear side of the supporter 810.

The audio unit 580 may be disposed inside the body display unit 500.

The audio unit 580 is electrically connected to the speaker 800 to emit sound to the speaker 800.

The audio unit 580 may be positioned under the body display 540 and may be positioned in front of the shutter guide 590 to be described later.

The audio unit 580 may be supported by the supporter 810. In more detail, the audio unit 580 may be provided with an audio bracket 581 fastened to the supporter 810. The audio bracket 581 may be fastened to the supporter 810 in front of the supporter 810.

The shutter 550 may be raised to open the rear opening portion 530A or lowered to close the rear opening portion 530A. In this case, a shutter guide 590 for guiding the opening and closing operation of the shutter 550 may be disposed inside the body display unit 500.

The shutter guide 590 may be positioned in a lower portion of the body display unit 500. The shutter guide 590 may be positioned behind the audio unit 580.

The shutter guide 590 may be extending vertically. A pair of shutter guides 590 may be provided to be spaced apart from each other left and right. One of the shutter guides 590 may guide a left side portion of the shutter 550, and the other of the shutter guides 590 may guide a right side portion of the shutter 550.

In more detail, protrusions may be formed to protrude outward from the left and right sides of the shutter 550. During the opening and closing operation of the shutter 550, the protrusion may be moved along the guide groove 590A formed in the inner surface of each shutter guide 590.

In this case, the guide groove 590A may include a vertical portion formed to be vertical and an inclined portion connected to the lower end of the vertical portion and inclined backward. Therefore, since the shutter 550 is opened, the shutter 550 is first moved to the rear and is then raised, the shutter 550 may not interfere with the rear cover 530.

The shutter guide 590 may be supported by the supporter 810. In more detail, at least one fastening bracket 591 fastened to the supporter 810 may be formed in each shutter guide 590. The fastening bracket 591 may be fastened to the supporter 810 in front of the supporter 810.

Meanwhile, a display mounting hole 511 in which the body display 540 is mounted may be formed in the body housing 511. The display mounting hole 511 may be formed by opening a part of the front surface of the body housing 510.

The front surface of the body display 540 mounted in the display mounting hole 511 may be covered by the front cover 520.

In addition, a sensing module mounting hole 512 in which a sensing module 850 is mounted may be formed in the body housing 511. The sensing module mounting hole 512 may be formed by opening a part of the front surface of the body housing 510. The sensing module mounting hole 512 may be disposed above the display mounting hole 511.

The sensing module 850 may be disposed above the body display 540.

The sensing module 850 may include a depth camera 851 and an upper cliff sensor 852. The depth camera 851 may be disposed above the upper cliff sensor 852. Since the functions of the depth camera 851 and the upper cliff sensor 852 have been described above, a duplicate description is omitted.

When the sensing module 850 is mounted in the display mounting hole 511, the depth camera 851 may perform sensing on the front region of the mobile robot 1 through the first cover open portion OP4 formed in the front cover 520. In addition, the upper cliff sensor 852 may perform sensing on the front lower side of the mobile robot 1 through the second cover open portion OP5 formed in the front cover 520.

In addition, the body housing 511 may be formed with a sound outlet 513 communicating with the sound hole 801 (see FIG. 5). In more detail, the sound outlet 513 may be formed to pass through the upper surface of the body housing 510. A pair of sound outlets 513 may be formed on the left and right sides of the neck insertion opening 500A.

In addition, a first insertion opening 510A may be formed in the top surface of the body housing 510. The first insertion opening 510A may form a neck insertion opening 500A together with a second insertion opening 520A formed in the top surface of the front cover 520.

In addition, the body housing 511 may be provided with at least one inner bracket 519 (see FIG. 11) for fastening the supporter 810 to the inner surface of the body display unit 500. In more detail, the inner bracket 519 may fasten the inner surface of the body housing 511 to the supporter 810. Thus, the load applied to the body housing 511 may be distributed to the supporter 810, and the body housing 511 may be reinforced.

Meanwhile, the rotation mechanism 700 may be disposed inside the display unit 500 and 600. The rotation mechanism 700 may rotate the head display unit 600 with respect to the body display unit 500.

The rotation mechanism 700 may include a rotating motor 710 that is disposed inside the body display unit 500 and a rotating shaft 720 that is rotated by the rotating motor 710. The rotation mechanism 700 may further include a head fastener 740 fastened to the head display unit 600 and a motor mounter 750 on which the rotating motor 710 is mounted.

The rotating motor 710 may be positioned behind the sensing module 850 and may be positioned above the hub unit 570.

The rotating motor 710 may be supported by the supporter 810. In more detail, the rotating motor 710 may be mounted to the motor mounter 750, and the motor mounter 750 may be supported by the supporter 810. In more detail, the motor mounter 750 may be provided with a fastening bracket (not shown) fastened to the supporter 810. However, the present disclosure is not limited thereto, and it is also possible that the motor mounter 750 is directly fastened to the supporter 810.

The rotating motor 710 and the motor mounter 750 may be disposed below the neck housing 620.

The rotating shaft 720 is connected to the rotating motor 710 to rotate. The rotating shaft 720 may extend upward from the rotating motor 710 and pass through a hollow 620A formed in the interior of the neck housing 620. As a result, the neck housing 620 may be formed to be thinner as compared to a case where the rotating motor 710 is disposed inside the neck housing 620. In addition, since the rotating motor 710 is not disposed inside the neck housing 620, electric wires or harnesses may easily pass through the interior of the neck housing 620.

The head fastening portion 740 may rotate together with the rotating shaft 720. Since the head fastening portion 740 is fastened to the head display unit 600, the head display unit 600 may rotate together with the head fastening portion 740 and the rotating shaft 720.

In more detail, the head fastening portion 740 may be fastened to the rear portion of the head display 640. However, the present disclosure is not limited thereto, and the head fastening portion 740 may be directly fastened to the head housing 610 or may be fastened to a separate bracket (not shown) provided in the head housing 610.

A more detailed configuration of the rotation mechanism 700 will be described later in detail.

Meanwhile, the mobile robot 1 may include the speaker 800 disposed inside the body display unit 500. In more detail, the speaker 800 may include a speaker unit electrically connected to an audio 580 to emit sound, and an enclosure surrounding the speaker unit.

The speaker 800 may be disposed inside the upper portion of the body display unit 500. In more detail, a vertical distance between the speaker 800 and the top surface of the body display unit 500 may be less than a vertical distance between the speaker 800 and the body 100 (see FIG. 1).

The speaker 800 may be positioned on the upper side than the supporter 810. In more detail, the vertical distance from the top surface of the body display unit 500 to the supporter 810 may be greater than the vertical distance from the top surface of the body display unit 500 to the bottom surface of the speaker 800.

The speaker 800 may face the sound hole 801 (see FIG. 5). In more detail, the speaker 800 may be disposed toward the sound hole 801 from the lower side of the sound outlet 513. As a result, the sound of the speaker 800 may be smoothly emitted to the sound hole 801.

A pair of speakers 800 may be provided on the left side and the right side to be spaced apart from each other. The pair of speakers 800A and 800B may be referred to as a first speaker 800A and a second speaker 800B, respectively.

The speaker 800 may be spaced apart from the rotation mechanism 700, more specifically, the rotating motor 710 and the motor mounter 750.

In addition, the speaker 800 may be disposed at a position higher than the rotating motor 710 in the body display unit 500. In more detail, a vertical distance n2 from the top surface of the body display unit 500 to the rotating motor 710 is greater than a vertical distance n1 from the top surface of the body display unit 500 to the bottom surface of the speaker 800.

With the above configuration, it is possible to minimize the adverse effect of rotation and vibration of the rotating motor 710 on the speaker 800. Therefore, it is possible to provide an improved sound experience to a user.

The speaker 800 may overlap the rotating shaft 720 in the horizontal direction. In more detail, the rotating shaft 720 may pass between the pair of speakers 800A and 800B. That is, the first speaker 800A and the second speaker 800B may be positioned on opposite sides of each other with respect to the rotating shaft 720.

In addition, the speaker 800 may overlap the supporting shaft 770 (see FIG. 12), which will be described later, in the horizontal direction.

In addition, the speaker 800 may be positioned on the side of the neck housing 620. At least a portion of the speaker 800 may overlap the neck housing 620 in the horizontal direction. In more detail, at least a portion of the speaker 800 may overlap a portion inserted into the body display unit 500 through the neck insertion opening 500A, in a horizontal direction. Accordingly, it is possible to minimize the adverse effect of the rotation and vibration of the rotating shaft 720 on the speaker 800.

The speaker 800 may be supported by the body housing 510 and may be spaced apart from the supporter 810. For example, a speaker mounting portion (not shown) on which the speaker 800 is mounted may be formed in the interior of the body housing 510.

Accordingly, vibration of the rotating motor 710 transferred to the supporter 810 through the motor mounter 750 may not be transferred to the speaker 800. Therefore, it is possible to prevent the vibration of the rotating motor 710 and the vibration of the speaker 800 from causing resonance.

Meanwhile, the supporter 810 may be extending vertically inside the body display unit 500. In more detail, the supporter 810 may be extending vertically inside the body housing 510.

The supporter 810 may be a vertical frame including a metal material.

The lower end of the supporter 810 may be supported by the body 100 (see FIG. 3). In more detail, the lower end of the supporter 810 may be supported by the top plate 230 of the body 100. That is, the supporter 810 may extend upward from the body 100 and may be positioned inside the body display unit 500 by passing through the lower opening portion 500B.

A plurality of supporters 810 may be provided to be spaced apart from each other left and right. In one example, a pair of supporters 810 may be provided. The pair of supporters 810A and 810B may be referred to as a first supporter 810A and a second supporter 810B, respectively.

The supporter 810 may support at least one of the interface module 560, the hub unit 570, the audio unit 580, and the shutter guide 590. The supporter 810 may be fastened to the motor mounter 750 to support the rotation mechanism 700. In addition, the supporter 810 may support the load of the head display unit 600 connected to the rotation mechanism 700. Therefore, since the above structures are not supported by the body housing 510, the body housing 510 may be formed to be thin and compact.

The supporter 810 may be fastened to the body housing 510 through the inner bracket 519 to reinforce the body housing 510. In addition, the load of the body display 540, the speaker 800, and the sensing module 850 supported by the body housing 510 may be distributed to the supporter 810.

FIG. 12 is a view showing a rotation mechanism according to an embodiment of the present disclosure, FIG. 13 is an exploded perspective view of a rotation mechanism according to an embodiment of the present disclosure, and FIG. 14 is a view showing a bottom surface of a shaft connecting body according to an embodiment of the present disclosure. In FIG. 12, the body housing 510, the rear cover 520, and the neck housing 620 have been removed.

The rotation mechanism 700 may include a rotating motor 710, a rotating shaft 720, a shaft connecting body 730, and a head fastening portion 740. The rotation mechanism 700 may further include a motor mounter 750, a shaft support portion 760, and a supporting shaft 770.

As described above, the rotating motor 710 may be disposed inside the body display unit 500. The rotating motor 710 may be positioned behind the sensing module 850 and may be disposed at a lower position than the speaker 800. The rotating motor 710 may be spaced apart from the speaker 800.

The rotating motor 710 may be mounted on the motor mounter 750.

The rotating shaft 720 may be rotated by the rotating motor 710. The rotating shaft 720 may be extending vertically. The lower end of the rotating shaft 720 may be connected to the rotating motor 710, and the upper end thereof may be connected to the shaft connecting body 730.

The upper end and the lower end of the rotating shaft 720 may be rotatably supported by bearings 724 and 725, respectively. Accordingly, the rotating shaft 720 may be rotated smoothly without being shaken in the horizontal direction.

In more detail, the rotating shaft 720 may include a shaft 721, a lower connection portion 722 formed at the lower end of the shaft 721, and an upper connection portion 723 formed at the upper end of the shaft 721.

The shaft 721 may be extending vertically.

The lower connection portion 722 may be connected to the rotating motor 710. The diameter of the lower connection portion 722 may be larger than the diameter of the shaft 721.

The lower bearing 752 may rotatably support the lower connection portion 722 in the horizontal direction. A lower bearing mounting portion 751 on which the lower bearing 752 is mounted may be formed in the motor mounter 750.

The upper connection portion 723 may be connected to the shaft connecting body 730. The diameter of the upper connection portion 723 may be smaller than the diameter of the shaft 721.

The upper bearing 764 of the shaft support portion 760 may rotatably support the upper connection portion 723 in the horizontal direction.

The shaft connecting body 730 may be connected to the upper connection portion 723 of the rotating shaft 720. A fitting hole into which the upper connection portion 723 is fitted may be formed in the shaft connecting body 730. The shaft connecting body 730 may be rotated together with the shaft 720.

A head fastening portion 740 fastened to the head display unit 600 may be coupled to a top surface of the shaft connecting body 730. Therefore, the head fastening portion 740 may be rotated together with the rotating shaft 720 and the shaft connecting body 730.

A locking protrusion 733 may be formed on the shaft connecting body 730. The locking protrusion 733 may be caught by a limiter 763, which will be described later, to limit a rotation range of the head display unit 600.

In more detail, the shaft connecting body 730 may include a panel portion 731 and a disc portion 732 formed under the panel portion 731.

The panel portion 731 may have a generally rectangular plate shape, but is not limited thereto. The head fastening portion 740 may be fastened to the top surface of the panel part 731.

The disc portion 732 may be formed smaller than the panel portion 731. The disc portion 732 may be formed to protrude downward from the bottom surface of the panel portion 731. The disc portion 732 may be integrally formed with the panel portion 731, but is not limited thereto.

A locking protrusion 733 may be formed in the disc portion 731. The locking protrusion 733 may be formed to protrude in the radially outward direction from an outer periphery of the disc portion 731.

Meanwhile, the shaft support portion 760 may rotatably support the rotating shaft 720 in the horizontal direction. The shaft support portion 760 may be positioned below the shaft connecting body 730. The shaft support portion 760 may be a fixed structure which is not rotated.

In addition, a limiter 763 may be formed to protrude upward from the shaft support portion 760. The locking protrusion 733 formed on the shaft connecting body 730 may be caught by the limiter 763 so that the rotation range is limited. Accordingly, the rotation range of the head display unit 600 may be easily limited, and the operation of the mobile robot 1 is similar to that of the person, so that the user may feel the familiarity.

In more detail, the shaft support portion 760 may include an annular portion 761, a plurality of protrusions 762, and an upper bearing 764.

The annular portion 761 may be penetrated by the rotating shaft 720. That is, the rotating shaft 720 may be connected to the shaft connecting body 730 by passing through the annular portion 761.

An upper bearing portion 764 may be mounted on the inner peripheral surface of the annular portion 761. The upper bearing 764 may rotatably support the rotating shaft 720 while being in contact with the rotating shaft 720 in a state of being mounted to the annular portion 761.

The protrusion 762 may protrude from the annular portion 761 in the radially outward direction. A plurality of protrusions 762 may be formed to be spaced apart from each other by a predetermined distance in the peripheral direction of the annular portion 761. In one example, the number of the protrusions 762 may be three.

A limiter 763 may be formed on any one of the plurality of protrusions 762. The limiter 763 may be formed to protrude upward from the protrusion 762.

A plurality of protrusions 762 may be respectively connected to a plurality of supporting shafts 770. Thus, the shaft support portion 760 may be fixed.

Since the shaft support portion 760 includes the annular portion 761 and the protrusion 762, the size of the annular portion 761 may be made compact while the supporting shaft 770 is sufficiently spaced apart from the rotating shaft 720. Therefore, even when the shaft support portion 760 is disposed inside the neck housing 620 (see FIG. 10), an electric wire or a harness may easily pass through the interior of the neck housing 620.

The supporting shaft 770 may fix the shaft support portion 760. The supporting shaft 770 may be extending vertically. The supporting shaft 770 may extend into the body display unit 500 through the interior of the neck housing 620 (see FIG. 10) from the shaft support portion 760, more specifically the protrusion 762.

The lower end of the supporting shaft 770 may be connected to the motor mounter 750.

A plurality of supporting shafts 770 may be provided to be connected to a plurality of protrusions 762, respectively. In this case, the number of supporting shafts 770 may be the same as the number of protrusions 762 of the shaft support portion 760. Accordingly, the plurality of supporting shafts 770 may firmly fix the shaft support portion 760.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

The invention claimed is:

1. A mobile robot, comprising:
    a body, the body including a driver configured to move the mobile robot;
    a vertically extending body display unit located at an upper side of a front portion of the body, the body display unit having a front surface and a rear surface;
    a display located at the front surface of the body display unit;
    a vertically extending supporter located inside the body display unit, the supporter having a lower end supported by the body;
    an interface module supported by the supporter, the interface module being electrically connected to the display;
    a head display unit rotatably connected to an upper portion of the body display unit;
    a rotating motor disposed inside the body display unit;
    a vertically extending rotating shaft connecting the rotating motor to the head display unit to rotate the head display unit; and
    a motor mount on which the rotating motor is mounted, the motor mount being supported by the supporter.

2. The mobile robot of claim 1, wherein the body display unit has a lower opening portion at a lower end thereof, and wherein the supporter extends through the lower opening portion of the body display unit.

3. The mobile robot of claim 1, further comprising an inner bracket configured to fasten the supporter to an inner surface of the body display unit.

4. The mobile robot of claim 1, wherein the interface module includes:
    a module case fastened to the supporter; and
    an interface printed circuit board located in the module case.

5. The mobile robot of claim 1, wherein a weight of the head display unit is supported by the supporter.

6. The mobile robot of claim 1, further comprising at least one speaker disposed inside the body display unit, the at least one speaker being spaced apart from the motor mount, the at least one speaker being supported by the body display unit.

7. The mobile robot of claim 6, wherein the at least one speaker is spaced apart from the supporter.

8. The mobile robot of claim 6, wherein a vertical distance from a top surface of the body display unit to a top of the rotating motor or a top of the supporter is longer than a vertical distance from the top surface of the body display unit to a bottom surface of the speaker.

9. The mobile robot of claim 6, further comprising an audio unit located inside the body display unit, the audio unit being electrically connected to the speaker, the audio unit being supported by the supporter.

10. The mobile robot of claim 1, further comprising:
    a shaft support portion configured to rotatably support an end of the rotating shaft, the shaft support portion being spaced from the motor mount; and
    at least one vertically extending support shaft located between the shaft support portion and the motor mount.

11. The mobile robot of claim 10, wherein the at least one support shaft comprises a plurality of support shafts.

12. The mobile robot of claim 11, wherein the shaft support portion includes:

an annular portion connected to the end of the rotating shaft; and a plurality of protrusions protruding from the annular portion in a radially outward direction, and wherein each support shaft of the plurality of support shafts is connected to a corresponding one of the plurality of protrusions.

13. The mobile robot of claim 1, further comprising:

a module support plate configured to support a service module, the module support plate being located behind the body display unit; and a plate mounting portion on which the module support plate is mounted, the plate mounting portion being located on the body, wherein the plate mounting portion is connected to the body display unit.

14. The mobile robot of claim 1, further comprising a hub unit disposed inside the body display unit, the hub unit being electrically connected to the interface module, the hub unit being supported by the supporter.

15. A mobile robot, comprising:

a body, the body including a driver configured to move the mobile robot;

a vertically extending body display unit located at an upper side of a front portion of the body, the body display unit having a front surface and a rear surface;

a display located at the front surface of the body display unit;

a head display unit rotatably connected to an upper portion of the body display unit;

a vertically extending supporter located inside the body display unit, the supporter having a lower end supported by the body;

a rotating motor disposed inside the body display unit, the rotating motor being supported by the supporter to rotate the head display unit; and a speaker located inside the body display unit, the speaker being supported by the body display unit.

16. The mobile robot of claim 15, wherein the speaker is spaced apart from the rotating motor and the supporter.

17. The mobile robot of claim 15, wherein the head display unit includes:

a neck housing rotatably connected to the body display unit; and a head housing connected to the neck housing, the head housing being spaced apart from the body display unit, wherein the rotating motor is located under the neck housing, and wherein the speaker is located beside the neck housing.

18. The mobile robot of claim 15, further comprising:

a vertically extending rotating shaft connecting the rotating motor to the head display unit to rotate the head display unit; and a motor mount on which the rotating motor is mounted, the motor mount being supported by the supporter.

* * * * *